United States Patent
Katzenberger et al.

(10) Patent No.: US 12,021,420 B2
(45) Date of Patent: Jun. 25, 2024

(54) STATOR FOR AN ELECTRIC ROTARY MACHINE

(71) Applicant: Siemens Aktiengesellschaft, Munich (DE)

(72) Inventors: Tobias Katzenberger, Bad Königshofen STT Unteressfeld (DE); Bastian Plochmann, Neustadt an der Aisch (DE)

(73) Assignee: Innomotics GmbH, Nuremberg (DE)

( * ) Notice: Subject to any disclaimer, the term of this patent is extended or adjusted under 35 U.S.C. 154(b) by 0 days.

(21) Appl. No.: 18/284,176

(22) PCT Filed: Mar. 25, 2022

(86) PCT No.: PCT/EP2022/057863
§ 371 (c)(1),
(2) Date: Sep. 26, 2023

(87) PCT Pub. No.: WO2022/207475
PCT Pub. Date: Oct. 6, 2022

(65) Prior Publication Data
US 2024/0088763 A1    Mar. 14, 2024

(30) Foreign Application Priority Data
Mar. 31, 2021 (EP) ..................... 21166276

(51) Int. Cl.
*H02K 15/12* (2006.01)
*H02K 3/38* (2006.01)
(Continued)

(52) U.S. Cl.
CPC ............. *H02K 15/12* (2013.01); *H02K 3/38* (2013.01); *H02K 15/105* (2013.01); *B29K 2105/12* (2013.01); *B29L 2031/08* (2013.01)

(58) Field of Classification Search
None
See application file for complete search history.

(56) References Cited

U.S. PATENT DOCUMENTS

2006/0250037 A1* 11/2006 Kummlee ............. H02K 5/136
310/43
2021/0036589 A1    2/2021 Buttner et al.

FOREIGN PATENT DOCUMENTS

DE          31 33 734 A1    3/1983
DE    10 2005 017 113 A1    10/2006
(Continued)

OTHER PUBLICATIONS

PCT International Search Report and Written Opinion of International Searching Authority dated Jul. 1, 2022 corresponding to PCT International Application No. PCT/EP2022/057863 filed Mar. 25, 2022.

*Primary Examiner* — Michael P. Rodriguez
(74) *Attorney, Agent, or Firm* — Henry M. Feiereisen LLC (57) ABSTRACT

In a method for encapsulating a winding overhang of a stator which includes a laminated core with windings inserted in grooves of the laminated core such that winding ends protrude from the grooves to form a winding overhang at a distance from a laminated core end and run in a region between the laminated core end and the winding overhang so as to form intermediate spaces between the winding ends, at least one of the intermediate spaces is spanned by a polymer layer such as to prevent a flow of encapsulating compound through the at least one spanned intermediate space, and the winding overhang is encapsulated with the encapsulating compound after placing the stator in a housing of an electric machine.

9 Claims, 5 Drawing Sheets (51) Int. Cl.
*H02K 15/10* (2006.01)
*B29K 105/12* (2006.01)
*B29L 31/08* (2006.01)

(56) References Cited

FOREIGN PATENT DOCUMENTS

DE 102005017113 A1 * 10/2006 ............... H02K 3/38
EP 3 772 158 A1 2/2021

* cited by examiner

STATOR FOR AN ELECTRIC ROTARY MACHINE

CROSS-REFERENCES TO RELATED APPLICATIONS

This application is the U.S. National Stage of International Application No. PCT/EP2022/057863, filed Mar. 25, 2022, which designated the United States and has been published as International Publication No. WO 2022/207475 A1 and which claims the priority of European Patent Application, Serial No. 21166276.2, filed Mar. 31, 2021, pursuant to 35 U.S.C. 119(a)-(d).

BACKGROUND OF THE INVENTION

The invention relates to a stator of an electric machine, wherein the stator comprises a laminated core with grooves and a winding overhang, wherein windings are introduced into the grooves, wherein the winding overhang is formed from winding ends protruding from the grooves and is at a distance from a laminated core end, wherein, in a region between the laminated core end and the winding overhang, the winding ends run in such a way that, in said region, intermediate spaces are formed between the (individual) winding ends.

In addition, the invention relates to a method for manufacturing a stator in which the aforementioned stator is provided.

The invention also relates to a method for encapsulating a winding overhang of a stator.

An electric, preferably rotary, machine with the aforementioned stator or with a stator manufactured according to the aforementioned method or with a winding overhang encapsulated according to the aforementioned method. The electric rotary machine is preferably a motor.

The stators and the winding overhang encapsulation methods of the type mentioned in the introduction are sufficiently well known from the prior art. For cost reasons, low-voltage motors in the power classes 0.5 kW to 2000 kW are impregnated by means of cold dipping methods or hot dipping methods (e.g., current-UV methods). Herein, the stators are immersed in a basin of liquid resin and then thermally cured. Herein, the geometric intermediate spaces of the copper winding are largely filled with resin and thus strengthened, additionally electrically insulated and thermally bonded to the laminated core. The winding overhangs, i.e., the necessary copper strands that connect the active regions in the grooves to one another, are located in the front areas of the stators, Before impregnation, the winding overhangs are again equipped by means of surface insulating materials (e.g., paper inserts), in order to electrically insulate the phases of the motor (e.g., 3 phases) from one another, and are pressed, compressed and banded in the mold to maintain the geometric dimensions and not exceed the intended overall length (shaft, rotor, bearing shield). A thermal connection of the winding overhangs to the aluminum housing is provided as standard exclusively via an air space/air gap, which is filled with flowing (convective) air. Thus, heat dissipation from the winding overhang takes place very inefficiently via the thermal contact junctions from winding to air and further from air to aluminum housing. This should be regarded as a critical and limiting factor for the motor performance class, since so-called hotspots form, in particular in the winding overhang, i.e., very high current intensity (Joule heating) and the compression and fixation of the wire bundles that is additionally required for geometrical and mechanical reasons result in regions that become significantly hotter than those inside the stator grooves. In the stator grooves, heat dissipation takes place very efficiently via the surrounding sheet iron. Thus, the problem is to provide improved heat dissipation from the winding overhangs, and thus the regions of the motor that limit the heat classes/performance class.

In order to at least partially counteract this problem, impellers can be provided within the motors, for example low-voltage motors, to achieve heat dissipation. This is one of the most favorable variants. The impellers are mounted directly on the shaft and drive the air convection in proportion to the speed of the motor so that convective air from the outside flows round the housing or the cooling fins thereof. However, this ventilation in turn has a negative effect on the performance or efficiency of the motors and is expensive/cost-intensive in terms of production and product technology. In addition, here, the winding overhang is not actively cooled since the heat can only be dissipated from the housing.

If better heat dissipation properties are required due to higher performance requirements, the winding overhang must be thermally bonded to the aluminum housing by means of so-called winding overhang encapsulation. This entails a molding material (reactive resin, e.g., epoxy, polyurethane or polyester) filled with thermally conductive particles. Depending upon the desired thermal conductivity and desired price level of the molding material, the filler particles consist of quartz flour, fused silica, boron nitride or aluminum oxide (list not exhaustive) and are dispersed as microparticles in them matrix (reactive resin) in an optimized particle size distribution, so that a molding compound is present which is still as low-viscous and free-flowing as possible. The filler content in the matrix is between 20 and 70% by volume depending upon the desired flowability at the processing temperature—i.e., process-dependent.

In addition to the material costs, the process costs of winding overhang encapsulation are much more significant since the impregnated stators have to be removed from the standard production flow and prepared for the winding overhang encapsulation by means of encapsulating molds (first one side, then the other). During this, a type of inner mandrel is introduced into the bore of the stator in a form-fitting manner to prevent wetting of the inner bore with the encapsulating compound. If necessary, the stator is then heated to an elevated temperature (e.g., 80° C. to improve the flowability of the encapsulating compound). The encapsulating compound is then poured into the winding overhang reservoir housed in this way. Then, the compound is cured for several hours at about 150° C., for example in a hot-air oven, After curing (and cooling), the respective other side of the winding overhang is also encapsulated). Thus, after the two individual processes, the encapsulation body encloses both winding overhangs radially on the inside and radially on the outside, whereas the heat flow in the closed motor largely takes place radially outwardly toward the aluminum housing. Complete enclosure is rather a process-related phenomenon, since the internal mandrel serves as the housing wall and subsequently has to be removed and cleaned.

Overall, winding overhang encapsulation is a very expensive process (in terms of time, energy and material costs), which also introduces more material into the motor than would actually be necessary for the desired property (heat dissipation of the winding overhang in the direction of the housing, radially outwardly).

DE 10 2005 017 113 A1 specifies a protective layer for a winding overhang of an electric machine. It has a first and a second covering layer. The first and the second covering layer surround an electric conductor arrangement of the winding overhang. The first covering layer consists of a polymer material that is gel-like and self-healing in the entire temperature range of the application. The second covering layer directly surrounds the first covering layer. It consists of a harder material than the first covering layer.

Thus, the object of the present invention can be seen as providing a stator in which the method for winding overhang encapsulation can be simplified in a cost-saving manner.

SUMMARY OF THE INVENTION

According to the invention, the object is achieved with a stator as mentioned in the introduction in that at least one of the intermediate spaces is spanned by a polymer layer such that a flow of liquid medium through the at least one spanned intermediate space is prevented.

The fact that the winding overhang is at a distance from the laminated core end means that there are winding sections lying between the winding overhang and the laminated core and which thus lie neither in the winding overhang (to be encapsulated later) nor in the laminated core.

Thus, a stator is provided with which the winding overhang can be encapsulated without additional tools.

In one embodiment, it can be provided that the polymer layer forms an elastic and dimensionally flexible release layer. For example, the polymer layer nestles against the winding overhang in the form of an inner jacket surface.

In one embodiment, it can be provided that the liquid medium is a winding overhang encapsulating compound.

In one embodiment, it can be provided that the winding overhang encapsulating compound is a liquid molding material with thermally conductive particles.

In one embodiment, it can be advantageous for the molding material to be reactive resin, e.g., epoxy, polyurethane or polyester.

In one embodiment, it can be advantageously provided that the thermally conductive particles embedded as microparticles in the matrix are quartz flour, fused silica, boron nitride or aluminum oxide particles.

In one embodiment, it can be provided that the polymer layer is realized by a helical spray pattern.

In one embodiment, it can be provided that the polymer layer is multi-layered. As a result, the polymer layer can be non-porous.

In one embodiment, it can be provided that the distance is from approximately 5 mm to approximately 150 mm.

In one embodiment, it can be provided that the polymer layer has a thickness of approximately 0.1 mm to 3 mm, preferably between 0.5 mm and 1.5 mm, for example approximately 1.0 mm.

In one embodiment, it can be expedient for all intermediate spaces to be spanned by the polymer layer.

In one embodiment, it can be provided that the polymer layer is applied on the inner side of the stator and/or on the outer side of the stator.

In one embodiment, it can be provided that the polymer layer is embodied as a tape with a width greater than or equal to the distance.

In one embodiment, it can be expedient for the polymer layer not to protrude into the bore of the stator provided for a rotor.

In one embodiment, it can be provided that the polymer layer includes cured plastic adhesive, preferably consists of cured plastic adhesive.

In one embodiment, it can be provided that the plastic adhesive is sprayed on in the form of threads such that the threads are spun onto one another in the form of overlapping loops to form a network structure, wherein the network structure covers the at least one of the intermediate spaces.

In one embodiment, it can be provided that the threads have a diameter of from approximately 50 μm (microns) to approximately 500 μm.

According to the invention, the object is also achieved by a method as mentioned in the introduction for manufacturing a stator in that at least one of the intermediate spaces is spanned by a polymer layer such that a flow of liquid medium through the at least one spanned intermediate space is prevented.

In one embodiment, it can be provided that the polymer layer is produced by spraying-on and/or spinning-on and/or spray-coating an adhesive-containing medium by means of a nozzle.

In one embodiment, it can be expedient if, during production, the nozzle is moved in such a way that the movement of the nozzle causes the adhesive-containing medium to be applied in layers over a large area such that the adhesive-containing medium covers the at least one intermediate space.

In one embodiment, it can be provided that the adhesive-containing medium includes a thermoplastic hot melt adhesive.

In one embodiment, it can be advantageously provided that a thread of a thermoplastic hot melt adhesive is produced by means of a nozzle; during production, the nozzle is moved in such a way that the thread is applied by the movement of the nozzle such that the thread is spun-on in the form of overlapping loops and/or the like in order to form a network structure, wherein the network structure covers the at least one of the intermediate spaces.

In one embodiment, it can be provided that the thread is applied in layers and over a large area in the form of loops.

In one embodiment, it can be provided that the thermoplastic hot melt adhesive is supplied to the nozzle at a working pressure of between 1 bar and 10 bar.

In one embodiment, it can be provided that the thermoplastic hot melt adhesive is supplied to the nozzle at a working temperature of between 180° C. and 220° C.

In one embodiment, it can be provided that all intermediate spaces are spanned by a polymer layer.

In one embodiment, it can be provided that the polymer layer is applied on the inner side of the stator and/or on the outer side of the stator.

When the polymer layer is applied on the inner side of the stator, the stator can already be enclosed in the housing.

When the polymer layer is applied on the outer side of the stator, no polymer material can reach the inner side of the stator.

In one embodiment, it can be provided that the thermoplastic hot melt adhesive is applied fully automatically, in particular by means of a robot.

In one embodiment, it can be provided that the polymer layer is produced from a material that solidifies within a few seconds to minutes under normal conditions (room temperature about 25° C. and pressure of about 1 bar). Here, examples of possible materials are polyolefins, polyamides, polypropylene, polyethylene, or generally the class of commercially available hot melt adhesives. Here, the selection should be made with regard to the adhesion properties on the winding overhang and the required flexibility of shape and the subsequent application temperature or curing temperature of the encapsulating compound. After application of the aforementioned spray adhesive release layer, the encapsulating compound can be simply introduced (poured or dispensed) into the region between the winding overhang and the housing without the need for a very complex enclosing process, which makes commercial encapsulating processes expensive and uneconomic for some motors in certain performance classes. Therefore, the polymer layer as a spray adhesive interface enables the realization of economical winding overhang encapsulation that is independent of variance.

In addition, according to the invention, the object is achieved with a method for encapsulating a winding overhang of a stator in that the aforementioned stator is provided or manufactured according to the aforementioned method and is inserted into a housing of an electric machine and at least one winding overhang of the stator is encapsulated with an encapsulating compound and without further aids.

In one embodiment, it can be provided that the polymer layer is at least partially removed after the encapsulation and curing of the encapsulating compound.

In one embodiment, it can be expedient for both winding overhangs of the stator to be provided with a polymer layer as described above and preferably encapsulated.

In addition, an electric, preferably rotary, machine with the aforementioned stator is also part of the present disclosure.

BRIEF DESCRIPTION OF THE DRAWING

Further features, properties and advantages of the present invention will emerge from the following description with reference to the attached figures. The figures show schematically.

DETAILED DESCRIPTION OF PREFERRED EMBODIMENTS

In the exemplary embodiments and figures, elements that are the same or have the same effect can in each case be provided with the same reference symbols. The reference symbols are only intended to simplify identification of the elements provided with the reference symbols and do not have any restrictive effect on the protected subject matter.

Figure 1:
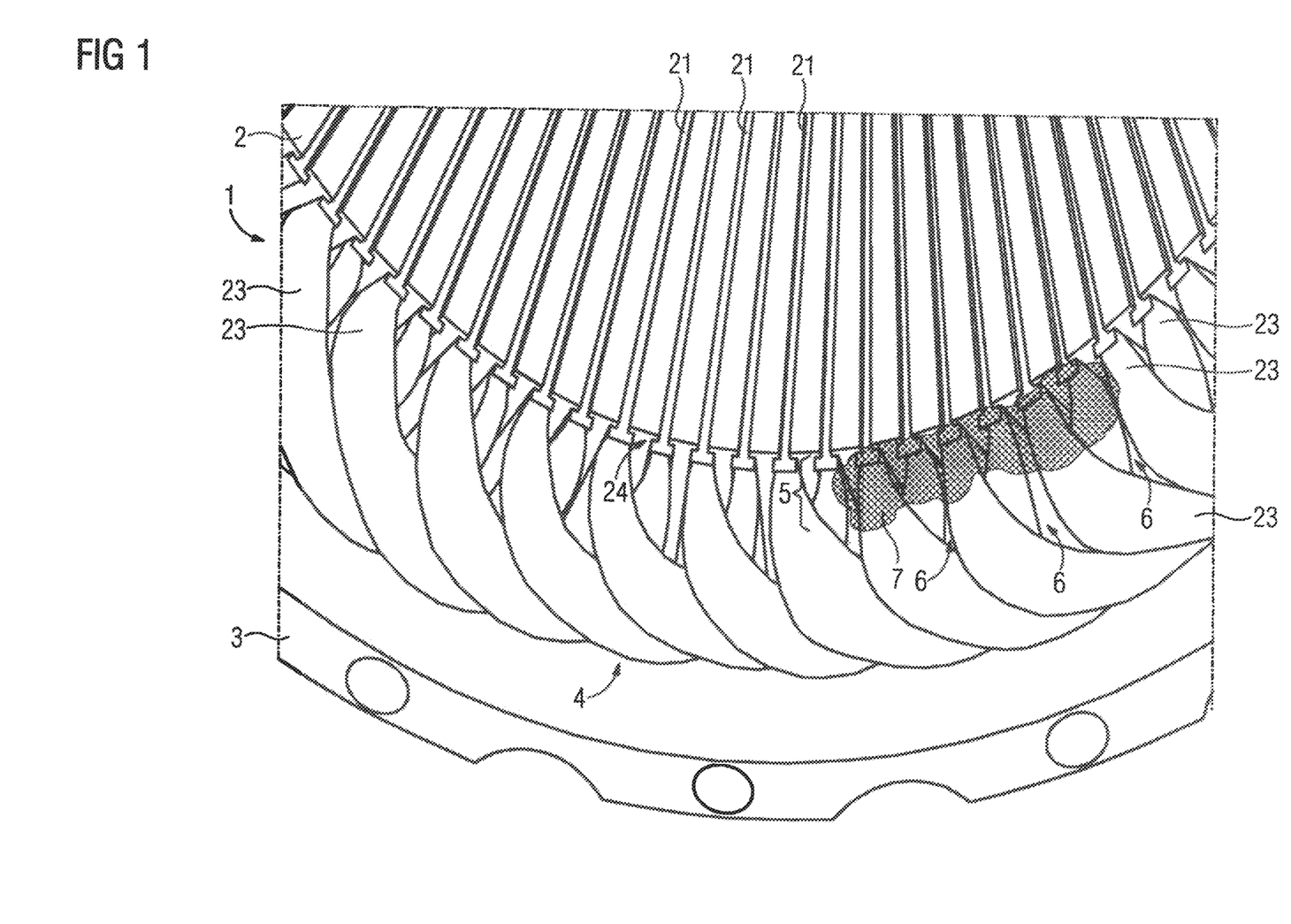
FIG. 1 an enlarged section of a stator of an electric rotary machine in a perspective view, FIG. 2 a section through the laminated core in FIG. 1, FIG. 3 an enlarged section of FIG. 1, FIG. 4 a winding overhang encapsulation process according to the prior art, FIGS. 5 to 7 various method steps of a method for winding overhang encapsulation, and FIG. 8 a flow diagram of the method for winding overhang encapsulation.

FIG. 1 shows an example of an enlarged section of a stator 1 of an electric rotary machine in perspective view and thus the inner side of the stator 1 can be seen, but not the outer side. In individual cases, the electric machine can be embodied as a linear electric machine. Other components that are usually present in the electric rotary machine, such as, for example, rotor, rotor shaft, bearing shields, etc., are not depicted in FIG. 1.

The stator 1 comprises a laminated core 2 with a plurality of individual stator laminations.

Figure 2:
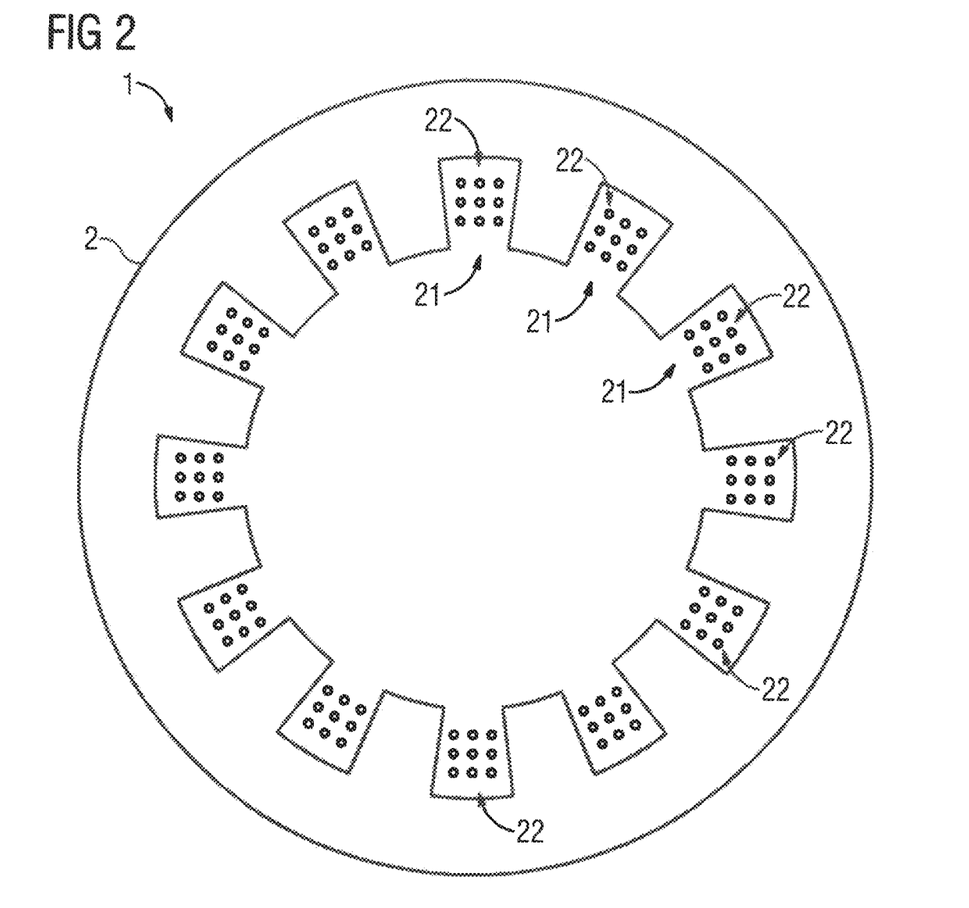

FIG. 2 shows a section through the laminated core 2. In FIG. 2, it can in particular be identified that grooves 21 are introduced into the laminated core 2 (on the inner side of the stator). The laminated core 2 is manufactured in the conventional manner and therefore does not need to be explained in more detail.

As is generally the case, the grooves 21 can be introduced into the laminated core 2 due to the fact that the stator laminations are already punched out accordingly.

Windings 22 of a stator winding system are introduced into the grooves 21. The windings 22 can form a multiphase, for example three-phase, stator winding system. As a rule, the windings 22 of the individual phases are introduced into the grooves 21 sequentially one after the other. The insertion of the windings 22 as such takes place in the conventional manner and therefore does not need to be explained in more detail. If required, the windings 22 can be embodied as so-called wild windings or as so-called laid windings. The windings 22, for example, round wires, enameled wires, can, for example, be formed as copper strands from a plurality of copper wires.

It can also be identified from FIG. 1 that the stator 1 is inserted in a housing 3 that is, for example, made of aluminum.

FIG. 1 shows one winding overhang 4 of the stator 1. The other winding overhang is located on an end opposite the end of the stator 1 shown in FIG. 1 and is not depicted for the sake of simplicity.

The winding overhang 4 is formed by free winding ends 23, which are not introduced into the grooves 21. Herein, the winding ends 23 projecting from the grooves 21 in the longitudinal direction of the stator 1 are combined or bound together to form the winding overhang 4 at a distance 5 from a laminated core end 24 (an end face of the stator 1), They can, for example, be bound together by adhesive tape or the like. The formation of the winding overhang 4 from the winding ends 23 as such takes place in the conventional manner and therefore does not need to be explained in more detail.

The distance 5 can, for example, be from approximately 5 mm to 150 mm depending on the size of the stator 1.

Between the laminated core end 24 and the winding overhang 4, the winding ends 23 run approximately parallel to one another and also approximately parallel to the longitudinal axis of the stator 1.

FIG. 1 furthermore shows that the windings 22 are spaced apart from one another outside the laminated core 2 in the circumferential direction of the stator 1 or the winding overhang 4, so that intermediate spaces 6 are formed between the windings 22.

Only a few of the grooves 21, windings 22, winding ends 23 and intermediate spaces 6 are provided with reference symbols in the figures so as not to overload the figures unnecessarily.

The intermediate spaces 6, preferably all intermediate spaces 6, are spanned or covered by a polymer layer 7. The polymer layer 7 preferably adheres to the winding ends 23 without further aids or adhesives.

The polymer layer 7 can have a thickness of approximately 0.1 mm to 3 mm, preferably between 0.5 mm and 1.5 mm, for example approximately 1.0 mm.

Figure 3:
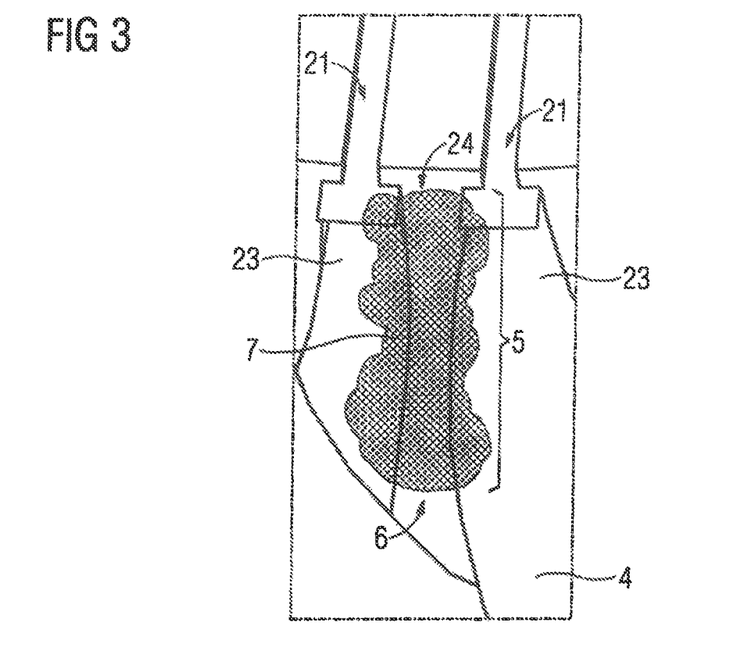

FIG. 3 shows an enlarged section of FIG. 1. It can be identified from FIG. 3 that an intermediate space 6 between the winding ends 23 is spanned or capped or covered by the polymer layer 7. The polymer layer can extend in the circumferential direction of the stator 1 at least between the two adjacent winding ends 23 and hi the longitudinal direction of the stator 1 from the laminated core end 24 to the winding overhang 4 in order to cap the intermediate spaces such that it is no longer possible for a liquid medium, in particular a winding overhang encapsulating compound, to flow through the intermediate space 6 (i.e., from the outer side of the stator to the inner side of the stator or vice versa).

The polymer layer 7 spans and thus seals the intermediate space 6 and adheres to both winding ends 23 through which the intermediate space 6 is formed.

Liquid molding material with thermally conductive particles can, for example, be used as a winding overhang encapsulating compound or simply encapsulating compound. The molding material can, for example, be reactive resin, e.g., epoxy, polyurethane or polyester. The thermally conductive particles embedded as microparticles in the matrix can, for example, be quartz flour, fused silica, boron nitride or aluminum oxide particles. These lists of materials are not exhaustive.

The polymer layer 7 preferably spans each intermediate space 6 in the described manner.

For example, the polymer layer 7 extends in the longitudinal direction of the stator for approximately 5 mm to 150 mm depending on the size of the stator 1.

Herein, the polymer layer 6 can span or cover the intermediate spaces on the inner side of the stator (as shown in FIG. 1 and FIG. 3) and/or on the outer side of the stator (not shown).

For example, the polymer layer can be embodied with a width greater than or equal to (≥) the distance 5. In addition, the tape can be self-contained so that it spans or caps or covers an inner side region of the stator and/or an outer side region of the stator, wherein the intermediate spaces 6 are adjacent to the respective region. Thus, the polymer layer 7 can be embodied as a collar on the inner side of the stator and/or on the outer side of the stator.

Preferably, the polymer layer 7 does not protrude into the bore of the stator 1 provided for a rotor.

The polymer layer 7 can include cured plastic adhesive, preferably consists of cured plastic adhesive.

For example, it is possible for thermoplastic hot melt adhesive, e.g., polyolefin or polyimide to be used. In specific cases, good results were achieved with the materials 3M Scotch Weld 3731, 3789 and 3779 made by 3M, wherein the former material is a polyolefin and the two other materials are polyamides.

Herein, the plastic adhesive can be sprayed on in the form of threads, so that the threads are spun onto each other in the form of overlapping loops and form a network structure that spans the intermediate space 6 or intermediate spaces 6. The threads can have a diameter of about 50-500 μm.

The polymer layer 7 can adhere to the winding ends 23 without further aids/adhesives. This in particular means that no further adhesive coating or the like is required for the polymer layer 7 to adhere to the winding ends 23 to make the intermediate spaces 6 and the inner side or the bore of the stator 1 liquid-tight.

The polymer layer 7 can also include adhesives cured at RT (room temperature, about 25° C.) or be formed from such adhesives. The plastic adhesive used can include fiber reinforcement. The polymer layer 7 can be formed by spraying on the plastic adhesive and, for example, take the form of spray-on wall paper. The plastic adhesive can be a chemically curing adhesive, for example UV-curing thermoset plastics can be used. Physically curing plastics can be used as the plastic adhesive. Filled plastics (fibers, particles) can be used as plastic adhesives provided that they remain applicable, for example in the form of spray-on wallpaper. It is also possible for the plastic adhesives used to be plastics containing solvents that solidify by evaporation of the solvent (e.g., hair lacquer, PVA). Reactive resins (e.g., epoxy, PEI, PU) can be used as plastic adhesives.

Although FIGS. 1 and 3 only refer to the winding overhang 4, obviously, a winding overhang opposite to the winding overhang 4 can also have a polymer layer which can be arranged in the same way as the above-described polymer layer 7 and spans the corresponding intermediate spaces in order to prevent the flow of liquid medium into the stator bore intended for the rotor.

Figure 4:
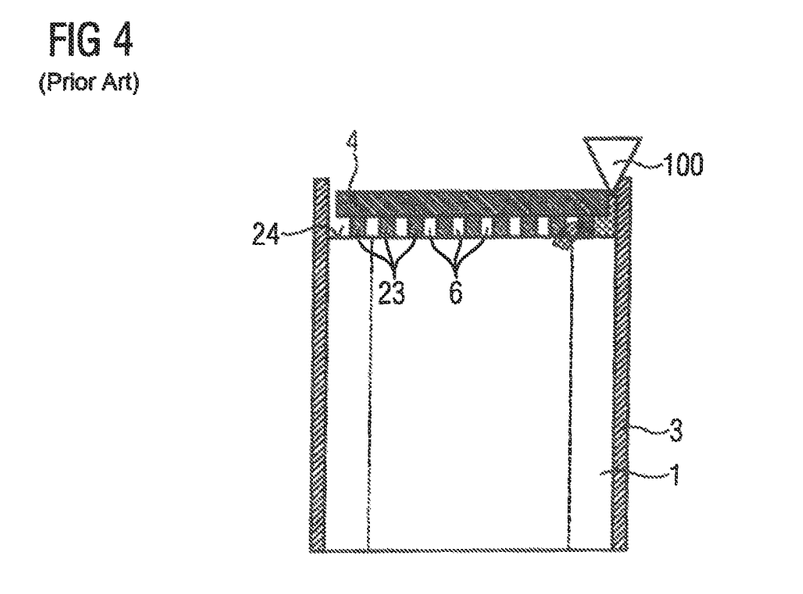

FIG. 4 illustrates the problems in the prior art mentioned in the introduction to the description. FIG. 4 shows the stator 1 in FIGS. 1 to 3 which is inserted into a housing 3. Intermediate spaces 6 are present between the winding ends 23 which extend between the laminated core end 24 and the winding overhang 4. It can be identified from FIG. 4 that, when a winding overhang is encapsulated with an encapsulating compound 100, said compound flows through the intermediate spaces 6 in the stator bore if no auxiliary tool is used. The auxiliary tool can, for example, be a mandrel or a large plastic tube which prevents compound from flowing into the stator bore. The auxiliary tool must always be sealed and depends on the diameter of the bore, i.e., it depends on the motor size.

The polymer layer 7 is not dependent on either the diameter of the bore or the machine size.

Figure 5:
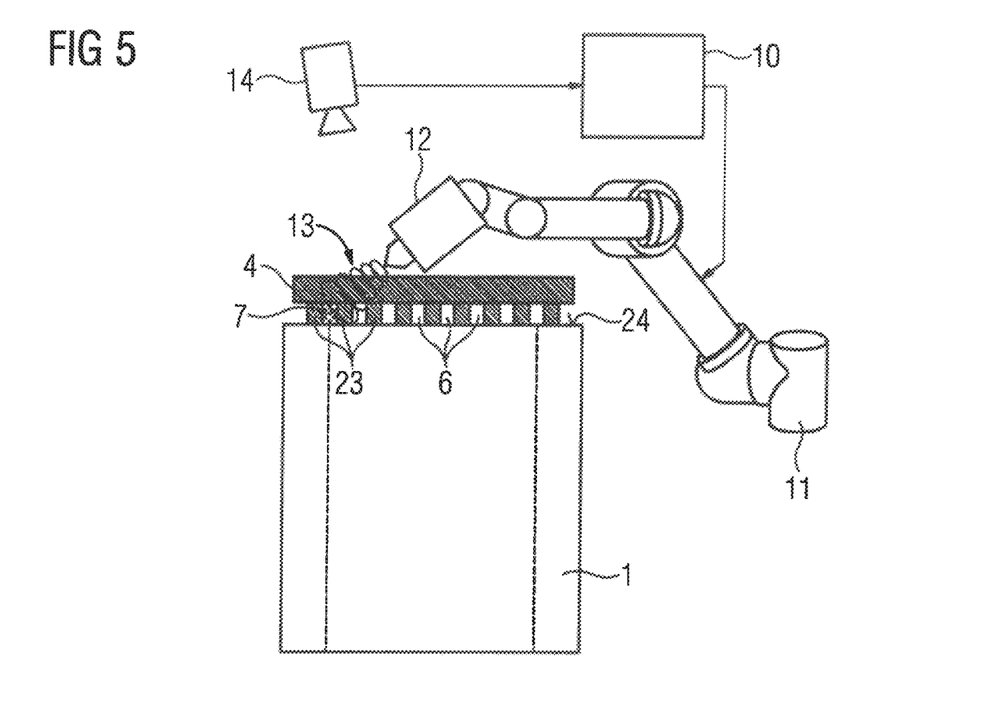
Figure 6:
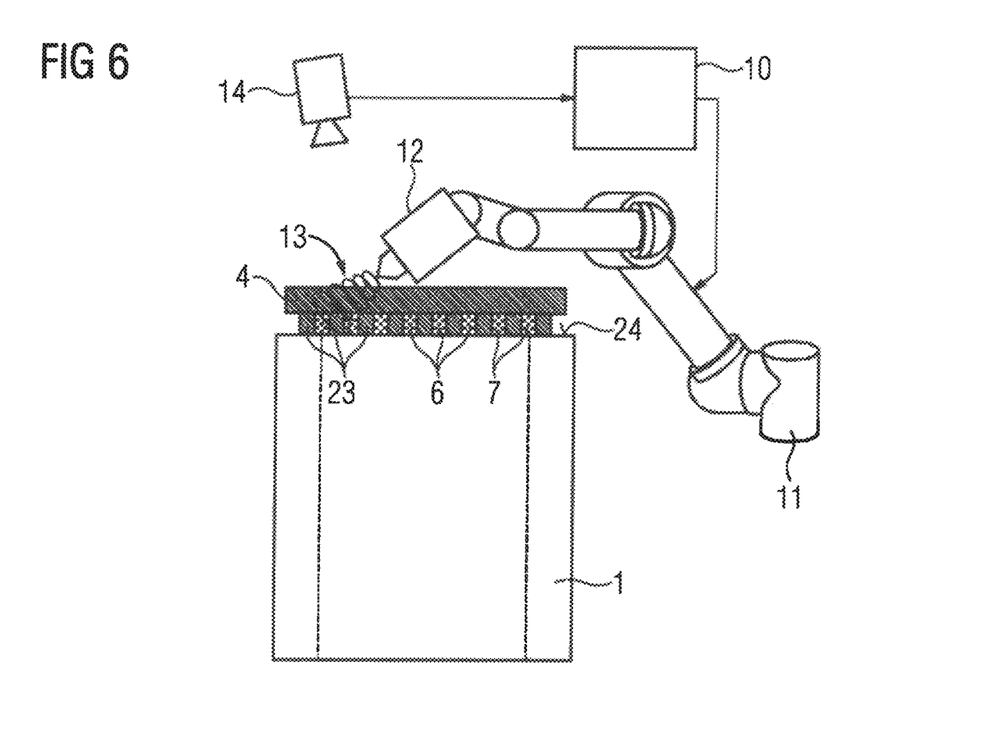
Figure 7:
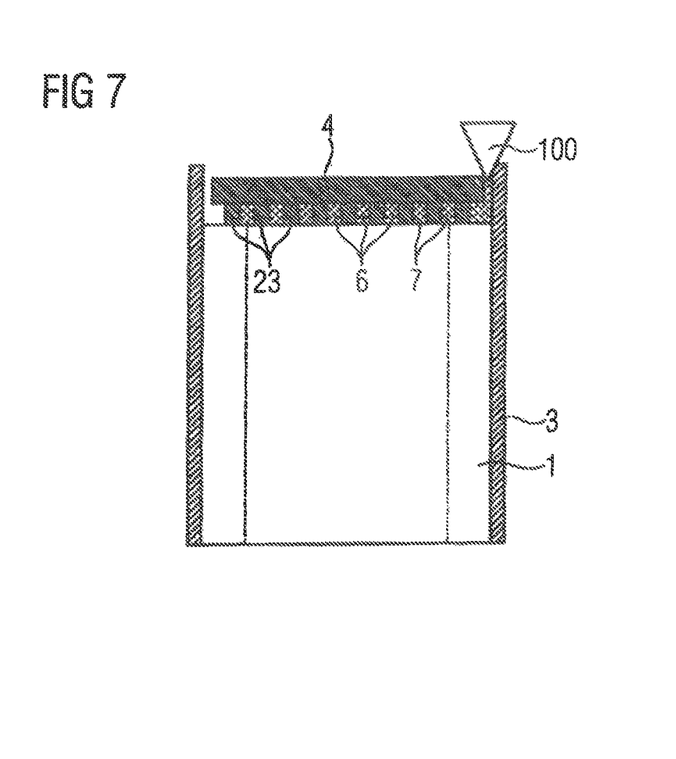
Figure 8:
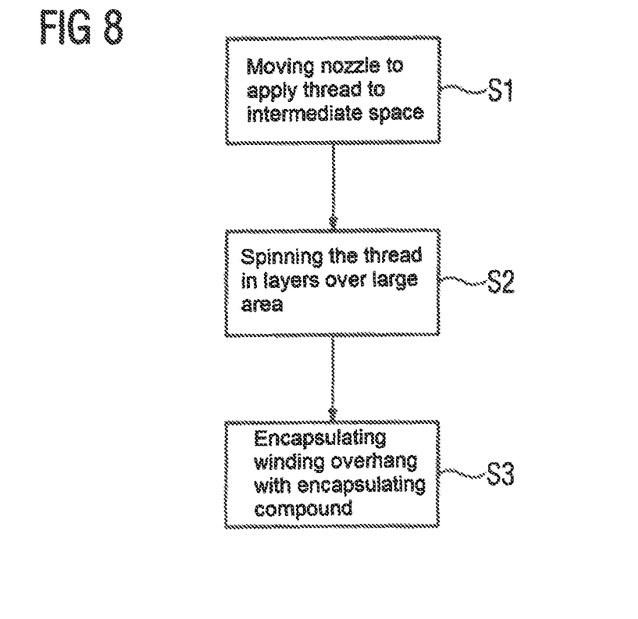

FIGS. 5 to 7 show examples of various method steps of a fully automated method for winding overhang encapsulation, the flow diagram of which is depicted in FIG. 8.

Therefore, reference is now made to FIGS. 5 to 8.

FIG. 5 shows the stator 1 with the winding overhang 4. In addition, it is possible to identify the polymer layer 7 that spans a single intermediate space 6 between two winding ends 23.

In addition, FIG. 5 shows a facility 10 which controls a robot arm 11 assigned thereto. At its free end, the robot arm 11 carries a nozzle 12 to which thermoplastic hot melt adhesive is fed. The nozzle 12 can also contain a reservoir of thermoplastic hot melt adhesive. Herein, the nozzle 12 produces a thread 13 of thermoplastic hot melt adhesive. During production, the nozzle 12 is moved in such a way that movement of the nozzle 12 causes the thread 13 to be applied to the intermediate space 6, for example, in order, for example, to span the intermediate space in the form of a network structure—step S1 in FIG. 8.

Herein, the robot arm 11 can be utilized in all three spatial degrees of freedom. The thread 13 can, for example, have a diameter in a range between 50 μm and 500 μm.

The thermoplastic hot melt adhesive can be fed to the nozzle 12 at a working pressure between 1 bar and 10 bar and/or at a working temperature between 180° C. and 220° C.

For example, a specific test was performed using a polyolefin-based adhesive with a melting point of about 200° C. The adhesive was sprayed on at a working temperature T of 220° C. and a pressure p of 3 bar. The adhesive emerged from the nozzle 30 at a speed of about 5 m/s. The distance between the nozzle 14 and the respective flat region was about 8 cm and the speed of the nozzle 12 was 600 rpm. The loops 13 adhered very well to the winding ends 23 and resulted in complete spanning of the intermediate spaces 6 to be sealed.

This process step and also the further process steps described below can, for example, be recorded by an optical recording system 14, for example a camera, for example a 3D camera, for control purposes, for example for quality control. The optical recording system 14 is assigned to the facility 10. The facility 10 can be configured to process and/or analyze the recordings made by the optical recording system 14 and, based on this, to adjust the control of the robot arm 11 accordingly. Herein, the recorded location and the recorded course of the intermediate spaces 6 can be fed to a facility 10. This can enable the facility 10 to take account as appropriate of the recorded location and the recorded course of the intermediate spaces 6 to be sprayed when the nozzle 12 is moved.

FIG. 6 shows a further process step in which the thread 13 is spun on in layers and covers a large area—step 32 in FIG. 8. The nozzle 12 is moved in such a way that the polymer layer 7 spans a plurality of, preferably all, intermediate spaces 6. The polymer layer 7 remains adhered to the winding ends 23 on the inner side of the stator.

This way of applying the polymer layer 7 is also possible if the stator 1 has already been inserted into the housing 3.

Obviously, the polymer layer 7 can also be applied on the outer side of the stator (not shown here).

FIG. 7 shows a process step in which the stator 1 is inserted into the housing 3 and its winding overhang 4 is encapsulated with an encapsulating compound 100—step 33 in FIG. 8, Herein, because of the polymer layer 7, the encapsulating compound 100 does not penetrate the bore of the stator 1 provided for the rotor.

The encapsulating compound 100 is a better heat conductor than air and thermally bonds the winding overhang 4 to the housing 3. This significantly reduces the number of hotspots created in the winding overhang during operation.

In addition, when the encapsulating compound 100 has cured, the polymer layer 7 can be at least partially peeled off.

Then, when the encapsulation of the stator 1 with the housing 3 is finished, the stator can be used in an electric, preferably rotary, machine. Thus, an electric, preferably rotary, machine with the stator 1 encapsulated with the housing 3 is part of the present disclosure.

In summary, the stator described here and the methods described here make it possible to dispense with enclosure by, for example, an inner mandrel as an encapsulating tool, which is very complex in conventional encapsulation processes since it is variance-dependent.

The polymer layer is not variance-dependent and can be applied fully automatically. In addition, the polymer layer can be at least partially or almost completely recycled.

Thus, the winding overhang encapsulation is no longer a complex, largely manual, process, instead it can be fully automated.

This makes it possible to thermally improve smaller shaft heights with a high number of variants in an economical and cost-efficient manner by means of winding overhang encapsulation so that a higher performance class can be achieved or the general operating temperature can be reduced with the same performance and this in turn results in a longer machine service life.

Although the invention has been illustrated and described in more detail by preferred exemplary embodiments, the invention is not restricted by the disclosed examples. Variations herefrom can be derived by the person skilled in the art without departing from the scope of protection of the invention as defined by the following claims. For example, features disclosed in the context of the methods can also be used to develop the described stator and vice versa.

What is claimed:

1. A method for encapsulating a winding overhang of a stator which comprises a laminated core with windings inserted in grooves of the laminated core such that winding ends protrude from the grooves to form a winding overhang at a distance from a laminated core end and run in a region between the laminated core end and the winding overhang so as to form intermediate spaces between the winding ends; the method comprising:
    spanning at least one of the intermediate spaces by a polymer layer such as to prevent a flow of encapsulating compound through the at least one spanned intermediate space; and
    encapsulating the winding overhang with the encapsulating compound after placing the stator in a housing of an electric machine.

2. The method of claim 1, further comprising:
    allowing the encapsulating compound to cure; and
    removing the polymer layer at least partially after encapsulating the winding overhang and curing of the encapsulating compound.

3. The method of claim 1, further comprising producing the polymer layer by spraying-on and/or spinning-on and/or spray-coating an adhesive-containing medium via a nozzle.

4. The method of claim 3, further comprising moving the nozzle such as to apply the adhesive-containing medium in layers and over a large area so that the adhesive-containing medium covers the at least one of the intermediate spaces.

5. The method of claim 1, further comprising:
    producing a thread of a thermoplastic hot melt adhesive via a nozzle; and
    moving the nozzle to apply the thread in such a way that the thread is spun-on in a form of overlapping loops so as to form a network structure which covers the at least one of the intermediate spaces.

6. The method of claim 1, further comprising spanning all of the intermediate spaces by the polymer layer.

7. The method of claim 1, further comprising applying the polymer layer on at least one of an inner side of the stator and an outer side of the stator.

8. The method of claim 5, wherein the thermoplastic hot melt adhesive is applied fully automatically.

9. The method of claim 5, wherein the thermoplastic hot melt adhesive is applied fully automatically by a robot.

* * * * *